（12）United States Patent
Nakagawa

(10) Patent No.: US 7,559,272 B2
(45) Date of Patent: Jul. 14, 2009

(54) CYLINDER APPARATUS

(75) Inventor: Kazumasa Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 11/724,241

(22) Filed: Mar. 15, 2007

(65) Prior Publication Data
US 2007/0215422 A1   Sep. 20, 2007

(30) Foreign Application Priority Data
Mar. 17, 2006   (JP)   ............................. 2006-074624

(51) Int. Cl.
*F16F 9/38*   (2006.01)
(52) U.S. Cl. ..................................... 92/51; 188/322.12
(58) Field of Classification Search .................. 92/51; 188/322.12
See application file for complete search history.

(56) References Cited

U.S. PATENT DOCUMENTS
3,907,080 A * 9/1975 Chadwick .............. 188/322.12

FOREIGN PATENT DOCUMENTS
JP   2004-116711   4/2004

* cited by examiner

*Primary Examiner*—F. Daniel Lopez
(74) *Attorney, Agent, or Firm*—Wenderoth, Lind & Ponack, L.L.P.

(57) ABSTRACT

A cylinder apparatus includes a cylinder and a rod contractibly extending from the cylinder. A cylindrical protecting cover is secured to the rod to cover the rod and the cylinder. The rod has a plate-shaped head cap secured thereto. The protecting cover is provided with clamp portions that axially clamp the outer peripheral portion of the head cap. The head cap is provided with circumferentially spaced projections projecting toward the cylinder, so that the axial dimension over which the head cap is clamped by the clamp portions is larger than the plate thickness of the head cap.

13 Claims, 4 Drawing Sheets

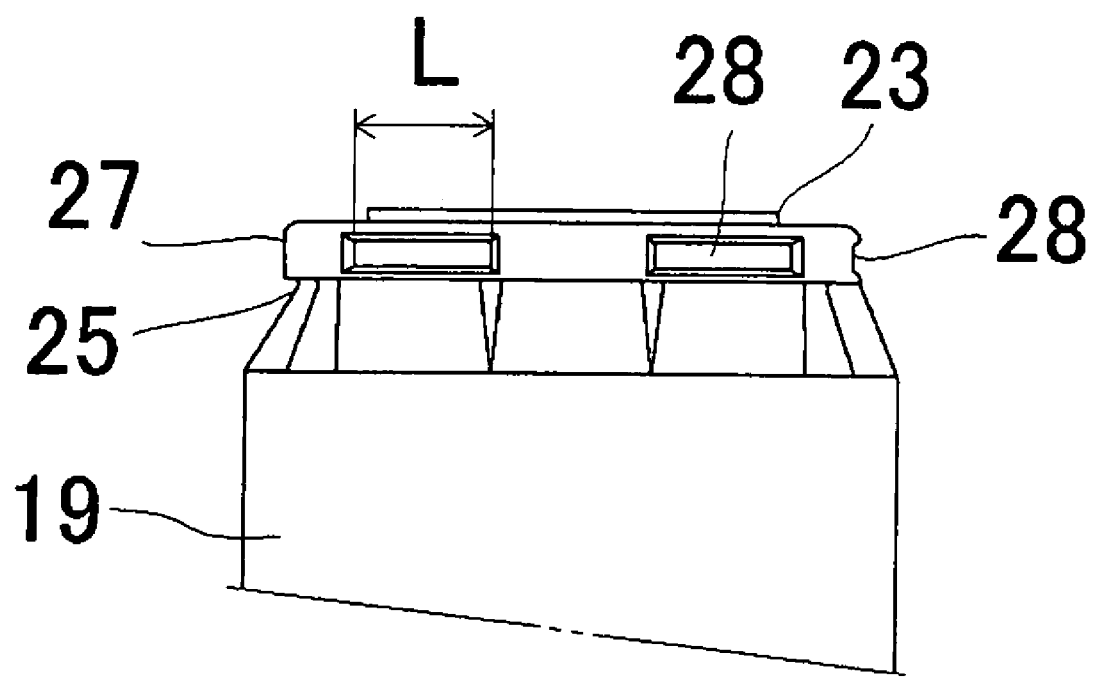

CYLINDER APPARATUS

BACKGROUND OF THE INVENTION

1. Field of the Invention

The present invention relates to cylinder apparatus such as a hydraulic shock absorber, a hydraulic cylinder, etc. for use in a suspension system of an automobile, for example.

2. Description of Related Art

As an example of cylinder apparatus, a common cylinder-type hydraulic shock absorber attached to a suspension system of an automobile will be explained below. As disclosed in Japanese Patent Application Publication No. 2004-116711, for example, a cylinder-type hydraulic shock absorber includes a cylinder having a hydraulic fluid sealed therein. A piston is slidably fitted in the cylinder. The piston has a piston rod connected thereto to form a piston assembly. The piston assembly is provided with a damping force generating mechanism including an orifice, a disk valve, etc. The flow of hydraulic fluid induced by extension and contraction of the piston rod is controlled by the damping force generating mechanism, thereby generating damping force. The hydraulic shock absorber further includes a protecting cover in the shape of a circular cylinder, one end of which is closed. The protecting cover is secured to the piston rod to cover it and the cylinder.

In the hydraulic shock absorber of the above-mentioned JP Application Publication, a protecting cover made of a synthetic resin material is used from the viewpoint of weight saving. A metallic head cap formed in the shape of a circular cylinder, one end of which is closed, by deep drawing process or the like, is welded to the piston rod, and the synthetic resin protecting cover is press-fitted to the head cap so as to be secured thereto by the elasticity of the material thereof. At this time, the protecting cover elastically clamps a side surface portion of the head cap, thereby preventing the protecting cover from tilting relative to the piston rod. Thus, the protecting cover can be stably secured to the piston rod.

The hydraulic shock absorber disclosed in the JP Application Publication suffers, however, from the following problems. It is necessary in order to stably secure the protecting cover to the piston rod to provide a sufficiently long axial dimension for the side surface portion of the head cap that is clamped by the protecting cover. Therefore, the weight of the head cap increases. Further, the production cost increases because the head cap is formed by deep drawing process.

SUMMARY OF THE INVENTION

The present invention has been made in view of the above-described circumstances.

Accordingly, an object of the present invention is to provide a cylinder apparatus that enables the protecting cover to be stably secured to the rod and that is capable of attaining weight saving and a reduction in production cost.

The present invention provides a cylinder apparatus including a cylinder and a rod contractibly extending from the cylinder. A cylindrical protecting cover is secured to the rod to cover the rod and the cylinder. The rod has a plate-shaped head cap secured thereto. The protecting cover is provided with clamp portions that axially clamp the outer peripheral portion of the head cap. The head cap is provided with circumferentially spaced projections projecting toward the cylinder, so that the axial dimension over which the head cap is clamped by the clamp portions is larger than the plate thickness of the head cap.

According to the cylinder apparatus of the present invention, because the head cap is provided with the projections, the axial dimension over which the head cap is clamped by the clamp portions of the protecting cover can be increased independently of the plate thickness of the head cap. Therefore, the protecting cover can be secured to the rod stable and reliably. In addition, it is possible to achieve weight saving and a reduction in production cost.

In addition, the present invention provides a cylinder apparatus including a cylinder and a rod contractibly extending from the cylinder. A cylindrical protecting cover is secured to the rod to cover the rod and the cylinder. The rod has a plate-shaped head cap secured thereto. The protecting cover is adapted to abut under pressure at the inner peripheral surface thereof against the outer peripheral portion of the head cap, thereby being secured to the head cap. The head cap is provided on the outer peripheral portion thereof with circumferentially spaced projections projecting toward the cylinder, so that the axial dimension of the outer peripheral portion is larger than the plate thickness of the head cap.

According to the cylinder apparatus of the present invention, because the projections are formed on the outer periphery of the head cap, the axial length over which the protecting cover and the head cap contact each other can be increased independently of the plate thickness of the head cap. Therefore, the protecting cover can be secured to the rod stably and reliably, and it is possible to achieve weight saving and a reduction in production cost.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 5 is an external view of an upper part of the protecting cover shown in FIG. 1.

DETAILED DESCRIPTION OF THE INVENTION

One embodiment of the present invention will be described below in detail with reference to the accompanying drawings.

Figure 1:
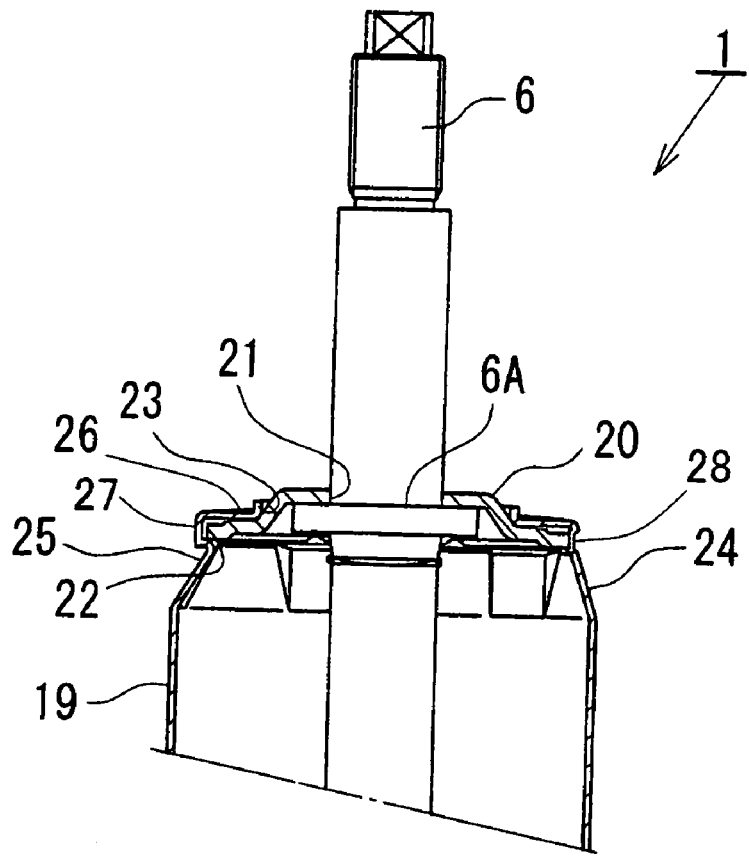
FIG. 1 is a fragmentary sectional view of an essential part of a hydraulic shock absorber as a cylinder apparatus according to one embodiment of the present invention, showing in an enlarged view a part of a protecting cover that is secured to a piston rod.
Figure 2:
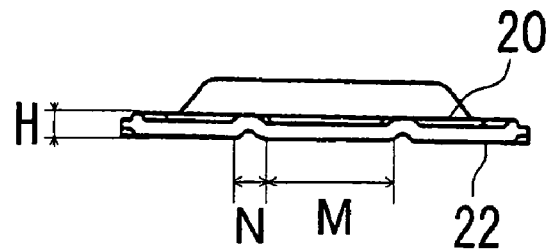
FIG. 2 is a side view of a head cap of the hydraulic shock absorber shown in FIG. 1.
Figure 3:
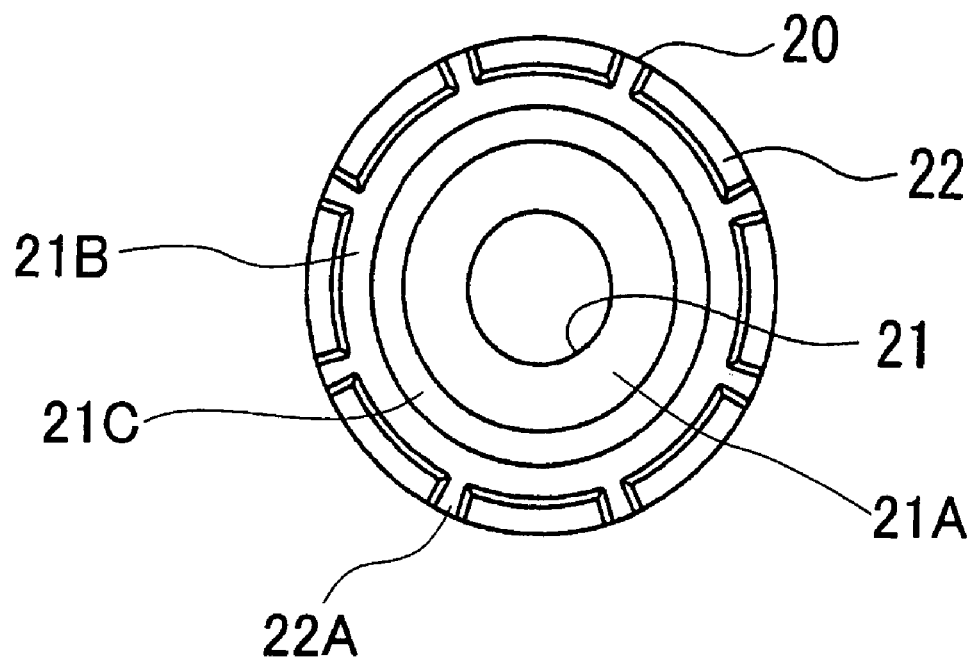
FIG. 3 is a plan view of the head cap shown in FIG. 2.
Figure 4:
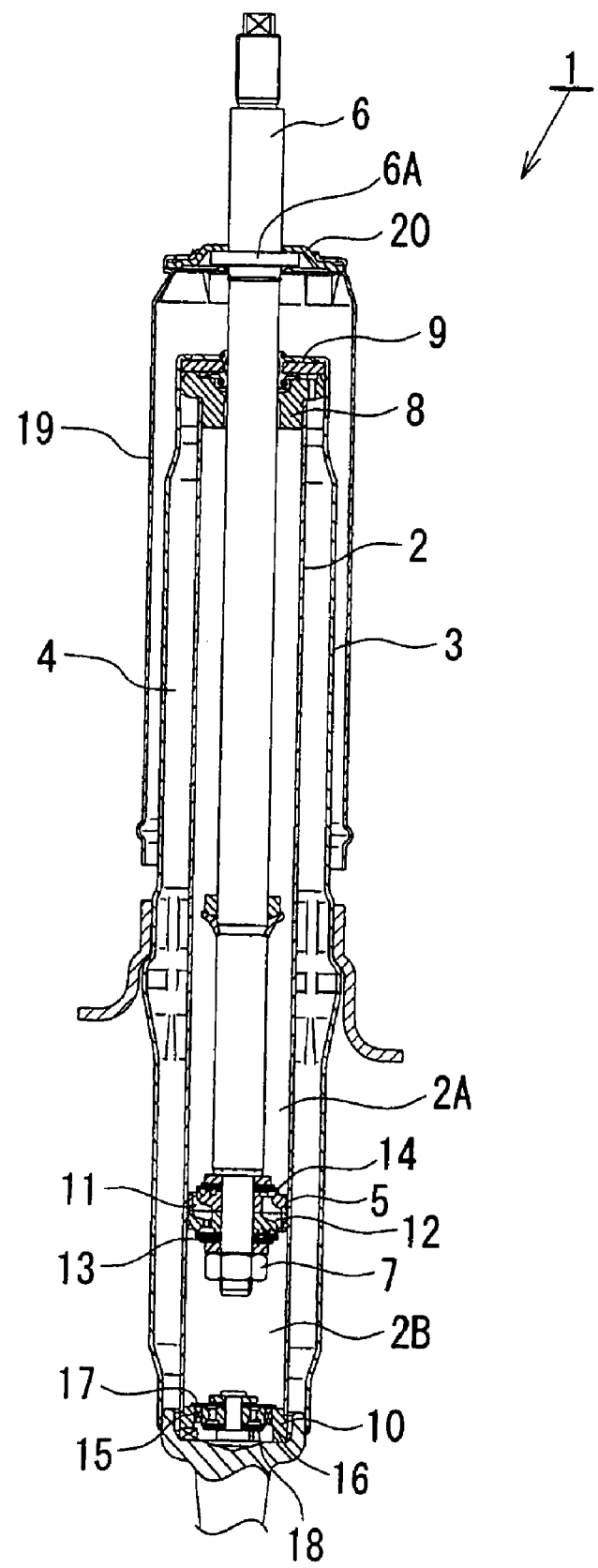
FIG. 4 is a longitudinal sectional view of the hydraulic shock absorber shown in FIG. 1.

As shown in FIG. 4, a cylinder apparatus according to this embodiment is a double-cylinder type hydraulic shock absorber 1 having a double-cylinder structure comprising a cylinder 2 and an outer cylinder 3 provided to surround the outer periphery of the cylinder 2. A reservoir 4 is formed between the cylinder 2 and the outer cylinder 3. A piston 5 is slidably fitted in the cylinder 2. The piston 5 divides the interior of the cylinder 2 into two chambers, i.e. a cylinder upper chamber 2A and a cylinder lower chamber 2B. One end portion of a piston rod 6 ("rod" in the claims) is connected to the piston 5 with a nut 7. The other end portion of the piston rod 6 extends through a rod guide 8 and an oil seal 9, which are fitted to an upper end portion of the double-cylinder structure comprising the cylinder 2 and the outer cylinder 3. The end portion of the piston rod 6 projects to the outside. A base valve 10 is provided in the lower end portion of the cylinder 2 to divide between the cylinder lower chamber 2B and the reservoir 4. The cylinder upper and lower chambers 2A and 2B have a hydraulic fluid sealed therein. The reservoir 4 has the hydraulic fluid and gas sealed therein.

The piston 5 is provided with an extension hydraulic fluid passage 11 and a compression hydraulic fluid passage 12 for communication between the cylinder upper and lower chambers 2A and 2B. The extension and compression hydraulic fluid passages 11 and 12 are provided with an extension damping force generating mechanism 13 and a compression damping force generating mechanism 14, respectively, each comprising an orifice and a disk valve to control the flow of hydraulic fluid to thereby generate damping force. The base valve 10 is provided with an extension hydraulic fluid passage 15 and a compression hydraulic fluid passage 16 for communication between the cylinder lower chamber 2B and the reservoir 4. The extension hydraulic fluid passage 15 is provided with a check valve 17 that allows only the flow of hydraulic fluid from the reservoir 4 to the cylinder lower chamber 2B. The compression hydraulic fluid passage 16 is provided with a compression damping force generating mechanism 18 comprising an orifice and a disk valve to impose resistance to the flow of hydraulic fluid from the cylinder lower chamber 2B to the reservoir 4.

Thus, during the extension stroke of the piston rod 6, as the piston 5 slides in the cylinder 2, the hydraulic fluid in the cylinder upper chamber 2A flows into the cylinder lower chamber 2B through the extension hydraulic fluid passage 11 of the piston 5, and damping force is generated by the extension damping force generating mechanism 13. At this time, an amount of hydraulic fluid corresponding to an amount by which the piston rod 6 withdraws from the cylinder 2 flows out from the reservoir 4 into the cylinder lower chamber 2B by opening the check valve 17 in the base valve 10, and the gas in the reservoir 4 expands correspondingly, thereby compensating for a volumetric change in the cylinder 2.

During the compression stroke, as the piston 5 slides in the cylinder 2, the hydraulic fluid in the cylinder lower chamber 2B flows into the cylinder upper chamber 2A through the compression hydraulic fluid passage 12 of the piston 5, and damping force is generated by the flow resistance of the compression damping force generating mechanism 14. In addition, the entry of the piston rod 6 into the cylinder 2 causes the hydraulic fluid in the cylinder lower chamber 2B to flow into the reservoir 4 through the compression hydraulic fluid passage 16 of the base valve 10. Thus, damping force is generated by the flow resistance of the compression damping force generating mechanism 18. The sum total of the damping forces thus generated is damping force during the compression stroke. At this time, the gas in the reservoir 4 is compressed by an amount corresponding to an amount by which the piston rod 6 enters the cylinder 2, thereby compensating for a volumetric change in the cylinder 2.

A protecting cover 19 is secured to the distal end portion of the piston rod 6 extending from the upper end portion of the double-cylinder structure comprising the cylinder 2 and the outer cylinder 3. The protecting cover 19 is formed from a synthetic resin material in the shape of a circular cylinder, one end of which is closed, to cover the periphery of the piston rod 6 and the outer cylinder 3.

The structure of securing the protecting cover 19 to the piston rod 6 will be explained below with reference to FIGS. 1 to 3 and 5.

The piston rod 6 has a collar 6A integrally formed thereon. A metallic, disk-shaped head cap 20 is secured to the collar 6A. The head cap 20 has a central portion slightly projecting to form a projecting surface 21A. The central portion of the head cap 20 is provided with an opening 21 for passing the distal end portion of the piston rod 6 therethrough. The outer peripheral portion of the head cap 20 has a plurality (8 in the illustrated example) of circumferentially equally spaced projections 22 (with a flat top) that project toward the cylinder 2 (downward as viewed in the figures), thereby forming a projection-recess configuration around the periphery of the head cap 20. With this structure, the axial dimension H of the outer peripheral portion of the head cap 20 is larger than the plate thickness of the head cap 20.

The portion directly adjoining the inner peripheral sides of the projections 22 is not deformed and remains as a flat surface 21B. A step 21C is formed between the flat surface 21B and the projecting surface 21A.

With the distal end portion of the piston rod 6 passed through the opening 21, the head cap 20 is centered by utilizing the step 21C, and the collar 6A is abutted against the back of the projecting surface 21A. In this state, the head cap 20 is secured to the piston rod 6 by welding or the like.

The bottom of the protecting cover 19 is formed with an opening 23 for receiving the projecting central portion of the head cap 20. The inner periphery of the opening 23 is bent toward the distal end of the piston rod 6. The bottom end wall of the protecting cover 19 is in a conical shape slightly sloped toward the cylinder 2 (downward as viewed in the figures) from the outer periphery toward the opening 23.

The bottom-side end of the side surface of the protecting cover 19 is tapered to form a taper portion 24. The taper portion 24 has cylinder-side clamp portions 25 formed by recessing the bottom end portion of the protecting cover 19 radially inward at a plurality of circumferentially equally spaced positions with a larger inclination than the rest of the taper portion 24. The outer peripheral portion of the head cap 20 is clamped between the shoulders of the clamp portions 25 facing the bottom of the protecting cover 19 and a rod end-side clamp portion 26 of the bottom of the protecting cover 19 at the periphery of the opening 23, whereby the protecting cover 19 is secured to the piston rod 6. The protecting cover 19 is made of a synthetic resin material and has proper elasticity. Therefore, the head cap 20 can be press-fitted into the protecting cover 19 in such a manner as to pass over the clamp portions 25.

A circular cylindrical fitting portion 27 for fitting the head cap 20 is formed between the cylinder-side clamp portions 25 (axially facing contact portions) and the rod end-side clamp portion 26 of the protecting cover 19. The fitting portion 27 is provided with circumferentially spaced radial abutments 28 projecting radially inward. The inner diameter of the radial abutments 28 is slightly smaller than the outer diameter of the head cap 20 to provide a difference-in-size for interference fitting.

The circumferential length L of each radial abutment 28 is longer than either the circumferential length M of each projection 22 or the circumferential length N of each recess 22A between each pair of adjacent projections 22. Accordingly, one radial abutment 28 surely contacts both a projection 22 and a recess 22A without fail, and it becomes possible to increase the effective axial dimension H over which the protecting cover 19 and the head cap 20 contact each other. Therefore, the protecting cover 19 can be secured to the piston rod 6 stably and reliably, and it is possible to achieve weight saving and a reduction in production cost.

Because the projections 22 are formed on the outer periphery of the head cap 20, the axial dimension H of the outer peripheral portion of the head cap 20 that is clamped by the clamp portions 25 of the protecting cover 19 can be increased sufficiently independently of the plate thickness of the head cap 20. Therefore, the protecting cover 19 can be secured to the piston rod 6 stably and reliably. In addition, the projections 22 enable the strength of the head cap 20 to be increased. Thus, the head cap 20 can be readily formed by pressing in comparison to the conventional head cap deep-drawn in the shape of a circular cylinder, one end of which is closed. In addition, it is possible to reduce the plate thickness of the head cap 20 to achieve weight saving.

Further, the circumferential length M of each of the projections 22 provided on the outer periphery of the head cap 20 is set larger than the circumferential length N of the recess 22A between each pair of adjacent projections 22. Therefore, the protecting cover 19 and the head cap 20 contact each other over a large area at the cylinder-side surface of the head cap 20. At the rod end side thereof, the head cap 20 contacts the protecting cover 19 over the entire circumference of the flat surface 21B. Thus, a large area (length) of contact is ensured. Accordingly, stress applied to the protecting cover 19 can be dispersed, and hence durability increases.

Further, because the circumferential length of each clamp portion 25 is longer than the circumferential length of each recess 22A between the projections 22, there is no possibility of any clamp portion 25 entering a recess 22A. Accordingly, the protecting cover 19 and the head cap 20 can be surely secured to each other irrespective of the rotational position thereof.

Although the present invention has been described above with regard to one embodiment in which it is applied to a double-cylinder type hydraulic shock absorber, by way of example, it should be noted that the present invention is not necessarily limited thereto but may be similarly applied to any other cylinder apparatus having a head cap and a protecting cover secured to the distal end of a rod, such as a hydraulic cylinder.

Although an example using a metallic, disk-shaped head cap 20 has been described above, the configuration of the head cap 20 is not necessarily limited thereto but may be a polygon such as an octagon. In this case, the protecting cover 19 should preferably have the same configuration.

Although in the foregoing embodiment the projections 22 of the head cap 20 are provided on the outer periphery thereof, the projections 22 may be provided on a radially intermediate portion of the head cap 20.

Although in the foregoing embodiment the protecting cover 19 is in the shape of a circular cylinder, one end of which is closed, the configuration of the protecting cover 19 is not necessarily limited thereto. The protecting cover 19 may be in the shape of a circular cylinder, both ends of which are open, and which is provided with only clamp portions.

When clamp portions are provided on the protecting cover 19, a gap may be provided between the inner periphery of the protecting cover 19 and the outer periphery of the head cap 20.

In a case where a difference-in-size for interference fitting is provided between the outer peripheral edge of the head cap 20 and the inner periphery of a portion of the protecting cover 19 that faces the outer peripheral edge of the head cap 20, the protecting cover 19 is formed in the shape of a circular cylinder, one end of which is closed, and need not be provided with clamp portions.

It should be noted that the present invention is not necessarily limited to the foregoing embodiments but can be modified in a variety of ways without departing from the gist of the present invention.

What is claimed is:

1. A cylinder apparatus comprising:
a cylinder;
a rod extending from said cylinder for extension and compression movements; and
a cylindrical protecting cover secured to said rod to cover said rod and said cylinder;
wherein said rod has a plate-shaped head cap secured thereto;
said protecting cover being provided with clamp portions that axially clamp an outer peripheral portion of said head cap;
wherein said head cap is provided with circumferentially spaced projections projecting toward said cylinder, so that an axial dimension over which said head cap is clamped by said clamp portions is larger than a plate thickness of said head cap.

2. A cylinder apparatus according to claim 1, wherein said projections are provided on the outer peripheral portion of said head cap.

3. A cylinder apparatus according to claim 2, wherein said protecting cover abuts under pressure at an inner peripheral surface thereof against the outer peripheral portion of said head cap.

4. A cylinder apparatus according to claim 3, wherein said protecting cover has a circumferentially spaced abutments provided on the inner peripheral surface thereof to abut against the outer peripheral portion of said head cap.

5. A cylinder apparatus according to claim 4, wherein a circumferential length of the outer peripheral portion of said head cap where each of said projections is provided and a circumferential length of the outer peripheral portion of said head cap where none of said projections are provided are both shorter than a circumferential length of each of the abutments on the inner peripheral surface of said protecting cover.

6. A cylinder apparatus according to claim 1, wherein said head cap has a flat portion at an inner periphery of said projections, and the clamp portions of said protecting cover contact said projections at a cylinder-side surface of said head cap and contact said flat portion at a rod end-side surface of said head cap.

7. A cylinder apparatus according to claim 6, wherein a circumferential length of said head cap where each of said projections is provided is longer than a circumferential length of said head cap where none of said projections are provided.

8. A cylinder apparatus according to claim 1, wherein at least clamp portions of said protecting cover that contact a cylinder-side surface of said head cap comprise circumferentially spaced axially facing contact portions, wherein a circumferential length of a non-contact portion between each pair of adjacent ones of said axially facing contact portions is shorter than a circumferential length of each of said projections of said head cap.

9. A cylinder apparatus according to claim 7, wherein at least clamp portions of said protecting cover that contact a cylinder-side surface of said head cap comprise circumferentially spaced axially facing contact portions, wherein a circumferential length of a non-contact portion between each pair of adjacent ones of said axially facing contact portions is shorter than a circumferential length of each of said projections of said head cap.

10. A cylinder apparatus according to claim 1, wherein said head cap is a press-formed part.

11. A cylinder apparatus comprising:
a cylinder;
a rod extending from said cylinder for extension and compression movements; and a cylindrical protecting cover secured to said rod to cover said rod and said cylinder;

wherein said rod has a plate-shaped head cap secured thereto;

said protecting cover being adapted to abut under pressure at an inner peripheral surface thereof against an outer peripheral portion of said head cap, thereby being secured to said head cap;

wherein said head cap is provided on the outer peripheral portion thereof with circumferentially spaced projections projecting toward said cylinder, so that an axial dimension of said outer peripheral portion is larger than a plate thickness of said head cap.

12. A cylinder apparatus according to claim 11, wherein said protecting cover has a circumferentially spaced abutments provided on the inner peripheral surface thereof to abut against the outer peripheral portion of said head cap.

13. A cylinder apparatus according to claim 12, wherein a circumferential length of the outer peripheral portion of said head cap where each of said projections is provided and a circumferential length of the outer peripheral portion of said head cap where none of said projections are provided are both shorter than a circumferential length of each of the abutments on the inner peripheral surface of said protecting cover.

* * * * *